United States Patent
Omi et al.

(10) Patent No.: US 7,868,602 B2
(45) Date of Patent: Jan. 11, 2011

(54) POWER SUPPLY DEVICE AND ELECTRONIC APPLIANCE THEREWITH

(75) Inventors: Masaki Omi, Kyoto (JP); Toru Takahashi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 346 days.

(21) Appl. No.: 12/088,754

(22) PCT Filed: Dec. 26, 2006

(86) PCT No.: PCT/JP2006/325836

§ 371 (c)(1),
(2), (4) Date: Mar. 31, 2008

(87) PCT Pub. No.: WO2007/080777

PCT Pub. Date: Jul. 19, 2007

(65) Prior Publication Data

US 2009/0278521 A1   Nov. 12, 2009

(30) Foreign Application Priority Data

Jan. 10, 2006  (JP) .............................. 2006-002388
Jan. 10, 2006  (JP) .............................. 2006-002398

(51) Int. Cl.
*G05F 1/575* (2006.01)
*H02M 1/36* (2007.01)

(52) U.S. Cl. ......................... 323/284; 363/49; 323/288; 323/901

(58) Field of Classification Search ................. 323/222, 323/224, 282, 284, 285, 288, 901; 363/49
See application file for complete search history.

(56) References Cited

U.S. PATENT DOCUMENTS

| 4,672,303 | A  | * | 6/1987  | Newton ....................... 323/285 |
| 6,765,371 | B2 |   | 7/2004  | Kataoka |
| 6,815,938 | B2 |   | 11/2004 | Horimoto |
| 7,002,330 | B2 | * | 2/2006  | Kitani et al. ................. 323/284 |
| 7,262,587 | B2 | * | 8/2007  | Takimoto et al. ............. 323/282 |

FOREIGN PATENT DOCUMENTS

| JP | 07-336999   | 12/1995 |
| JP | 09-009616   | 1/1997  |
| JP | 11-235026   | 8/1999  |
| JP | 2003-070238 | 3/2003  |
| JP | 2003-299348 | 10/2003 |
| JP | 2003-324941 | 11/2003 |
| JP | 2004-015881 | 10/2004 |
| JP | 2005-198410 | 7/2005  |

* cited by examiner

*Primary Examiner*—Gary L Laxton
(74) *Attorney, Agent, or Firm*—Fish & Richardson P.C.

(57) ABSTRACT

A power supply device includes a clamp circuit that increases the upper limit value of an error voltage stepwise after the device is started up. This makes it possible to shorten the rise time of an output voltage and to reduce the maximum current at start-up.

17 Claims, 8 Drawing Sheets

POWER SUPPLY DEVICE AND ELECTRONIC APPLIANCE THEREWITH

TECHNICAL FIELD

The present invention relates to a power supply device that generates a desired output voltage from an input voltage, and also relates to an electronic appliance provided therewith.

BACKGROUND ART

Conventionally, as a low-heat-loss stabilized power supply which operates with comparatively high efficiency in a large input-output difference condition, switching regulators have been widely used which generate a desired output voltage from an input voltage by driving an energy storage device (a capacitor, an inductor, or the like) by turning on and off (controlling the duty of) an output transistor.

A conventionally common switching regulator includes an error amplifier which amplifies the voltage difference between a feedback voltage Vfb which varies depending on an output voltage Vout and a predetermined reference voltage Vref, and turns on and off an output transistor by using an output signal (an error voltage Verr) of the error amplifier. More specifically, such a switching regulator generates a PWM (pulse width modulation) signal having a duty corresponding to the result of comparison between the error voltage Verr and a predetermined slope voltage Vslp (a triangular wave or a ramp wave), and turns on and off the output transistor by using the PWM signal (see, for example, Patent Publication 1 listed below, which was filed by the applicant of the present application).

The conventional switching regulator described above also includes a soft-start circuit as means for preventing an overcurrent from flowing into the load at the start-up of the device (when the output voltage Vout is too low). More specifically, the soft-start circuit described above generates a soft-start voltage Vss (a comparison voltage for soft starting) that starts increasing gently in response to an enabling of a power-on signal EN (an operation permission signal), and a PWM comparator generates a PWM signal having a duty corresponding to the result of comparison of the lower of the error voltage Verr and the soft-start voltage Vss with the slope voltage Vslp (see FIG. 7).

There are other conventional technologies related to the present invention. Patent Publication 2 listed below discloses and proposes a switching power supply control circuit wherein: one of the terminals of a switching power supply control IC is used as a CL terminal for overload protection; an overload protection circuit, which is conventionally connected to a CS terminal for soft starting, is here connected instead to the CL terminal, so as to achieve latch-mode overload protection realized by the turning off of an internal bias source (i.e., the stopping of the output via an OUT terminal); in addition, a comparator or the like for realizing an intermittent oscillation mode is added to the CL terminal. Here, when the pin of the CS terminal for soft starting, which terminal is connected to a PWM comparator, is short-circuited to the pin of the CL terminal for overload protection, the just mentioned circuit added to the CL terminal makes the potential at the CL and CS terminals rise and fall periodically, and thereby makes a main switching device repeatedly perform switching and then stop, thereby achieving intermittent oscillation.

Patent Publication 3 listed below discloses and proposes a DC/DC converter with a protection function including: an input power source; a main switch connected between the input power source and an output terminal and switchable between on and off states; a resistive divider circuit; a difference amplifier-comparator receiving at one input terminal thereof a reference voltage and receiving at the other input terminal thereof a voltage resulting from voltage division by the resistive divider circuit; a selection circuit that applies, to the resistive divider circuit, either an output voltage from the output terminal or an input voltage from the input power source; a PWM comparator connected at one input terminal thereof to the output of the difference amplifier-comparator and connected at the other input terminal thereof the output of a triangular wave generation circuit; a control circuit connected to the output of the PWM comparator and feeding the main switch with a signal for turning it on and off; and means for making the selection circuit feed the input voltage to the resistive divider circuit when the voltage from the input power source is equal to or lower than a predetermined voltage, and for making the selection circuit feed the output voltage from the output terminal to the resistive divider circuit when the voltage from the input power source is higher than the predetermined voltage.

Other conventional technologies directed to power supply devices utilizing soft starting different from that described above are found, for example, in Patent Publication 4 listed below.

Conventionally, in switching regulators that are required to provide high conversion efficiency, to minimize the on-state resistance of a rectifier device, synchronous rectification is adopted in which a synchronous-rectification transistor used as a rectifier device is turned on and off complementarily to an output transistor. Conventional technologies directed to such synchronous-rectification switching regulators are found, for example, in Patent Publications 5 and 6 listed below.

| | |
|---|---|
| Patent Publication 1 | JP-A-H07-336999 |
| Patent Publication 2 | JP-A-H09-9616 |
| Patent Publication 3 | JP-A-2004-15881 |
| Patent Publication 4 | JP-A-2003-324941 |
| Patent Publication 5 | JP-A-2003-299348 |
| Patent Publication 6 | JP-A-2003-70238 |

DISCLOSURE OF THE INVENTION

Problems to be Solved by the Invention

Certainly, provided with a soft-start circuit, the above described conventional switching regulator is capable of preventing an overcurrent from flowing into the load at the start-up of the device (see FIG. 7).

With the conventional switching regulator described above, however, since the switch current Isw is kept moderate by gradually increasing the on-duty of the output transistor after the device is started up, an overcurrent is prevented from flowing into the load at the cost of an accordingly slow rise of the output voltage Vout.

Also, in the conventional switching regulator described above, there exists a large difference between the maximum current at start-up (the maximum current immediately before the output voltage Vout becomes stable) and a stable current (a steady-state current after the output voltage Vout has become stable), and thus electric power is wasted at the start-up of the device.

Furthermore, if a synchronous rectification switching regulator is used in an application (e.g., a PWM brightness adjustment unit of a backlight incorporated in a liquid crystal panel) in which the above mentioned enable signal is enabled and disabled frequently, the response speed of the output voltage Vout (in the above example, the on/off frequency of the LED backlight) may lower due to the operation of the soft-start circuit described above.

The problems mentioned above will now be described in more detail with reference to FIG. 8. FIG. 8 is a diagram illustrating the lowering of the response speed of the output voltage Vout attributable to conventional soft starting. FIG. 8 schematically shows, along the vertical axis, the behavior (voltage or current waveforms) of the enable signal EN, the output voltage Vout, the switch voltage Vsw (the voltage that appears at the node between the output transistor and the synchronous rectification transistor), and the switch current Isw (the current that flows to the just mentioned node), as plotted against the horizontal axis, which represents the passage of time t.

As described above, soft starting is a function for preventing an overcurrent at the start-up of a device by making the on-period of an output transistor short and the off-period thereof long. Put otherwise, during soft starting, the off-period of a synchronous rectification transistor, which is driven complementarily to the output transistor, becomes short and the on-period thereof becomes long.

Here, at initial start-up, when the output voltage Vout is lower than the switch voltage Vsw, there is no risk of a reverse current from the load. However, at start-up with the output voltage Vout higher than the switch voltage Vsw, a reverse current may flow from the load to cause the output voltage Vout to drop to near the switch voltage Vsw at first. As a result, it takes a long time for the output voltage Vout to rise back to a desired level, resulting in slack response of the output voltage Vout to the enable signal EN.

An object of the present invention is to provide a power supply device capable of reducing the maximum current at start-up, and an electronic appliance therewith.

Means for Solving the Problem

To achieve the above object, according to one aspect of the present invention, a power supply device includes: an output transistor that generates an output voltage from an input voltage by being turned on and off; an error amplifier that generates an error voltage by amplifying a difference between a feedback voltage commensurate with the output voltage and a predetermined reference voltage; a clamp circuit that sets an upper limit value of the error voltage; a soft-start circuit that generates a comparison voltage for soft starting, the comparison voltage starting to rise when the power supply device is started up; a PWM comparator that compares the lower of the error voltage and the comparison voltage for soft starting with a predetermined slope voltage so as to generate a PWM signal having a duty corresponding to a comparison result; and means for turning the output transistor on and off by using the PWM signal. Here, the clamp circuit increases the upper limit value of the error voltage stepwise after the device is started up (first configuration).

It is preferable that, in the power supply device having the first configuration described above, the clamp circuit monitor the comparison voltage for soft starting and, as the value of the voltage increases, increase the upper limit value of the error voltage stepwise (second configuration).

It is preferable that, in the power supply device having the first configuration described above, the clamp circuit monitor a length of time that has passed since soft starting started and, when the length of passed time reaches a predetermined value, increase the upper limit value of the error voltage stepwise (third configuration).

It is preferable that the power supply device having one of the first to third configurations further include: an inductor a first end of which is connected to a node to which the input terminal is applied and a second end of which is connected to a first end of the output transistor; a diode an anode of which is connected to the first end of the output transistor and a cathode of which is connected to a node from which the output voltage extracted; and a capacitor a first end of which is connected to the node from which the output voltage is applied and a second end of which is connected to a node to which a standard voltage is applied, and generate the output voltage by stepping up the input voltage (fourth configuration).

To achieve the above object, according to another aspect of the present invention, a power supply device includes: an output transistor and a synchronous rectification transistor that generate a desired output voltage from an input voltage by being turned on and off complementarily to each other; an error amplifier that generates an error voltage by amplifying a difference between a feedback voltage commensurate with the output voltage and a predetermined reference voltage; a soft-start circuit that generates a comparison voltage for soft starting, the comparison voltage starting to rise in response to a level change in an enable signal; a PWM comparator that compares the lower of the error voltage and the comparison voltage for soft starting with a predetermined slope voltage so as to generate a PWM signal having a duty corresponding to the comparison result: and means for turning on and off the output transistor and the synchronous rectification transistor by using the PWM signal (fifth configuration).

It is preferable that the power supply device having the fifth configuration described above further include: a reference voltage detection circuit that detects, each time the enable signal changes a level thereof, whether or not the reference voltage has risen; an output voltage detection circuit that detects, each time the reference voltage detection circuit finds the reference voltage to have risen, whether or not the output voltage has reached a predetermined threshold value; and a soft-start interruption circuit that, when the output voltage detection circuit finds the output voltage to have reached the predetermined threshold value, cuts off a transmission path through which the comparison voltage for soft starting is transmitted from the soft-start circuit to the PWM comparator (sixth configuration).

It is preferable that the power supply device having the fifth or sixth configuration described above further include a clamp circuit that sets an upper limit value of the error voltage, and increase the upper limit value of the error voltage stepwise after the level change in the enable signal (seventh configuration).

It is preferable that, in the power supply device having the seventh configuration described above, the clamp circuit monitor the comparison voltage for soft starting, and, as the value of the comparison voltage for soft starting increases, increase the upper limit value of the error voltage stepwise (eighth configuration).

It is preferable that, in the power supply device having the seventh configuration described above, the clamp circuit monitor a length of time that has passed since soft starting started and, when the length of passed time reaches a predetermined value, increase the upper limit value of the error voltage stepwise (ninth configuration).

It is preferable that the power supply device having one of the fifth to ninth configurations further include: an inductor a first end of which is connected to a node to which the of the input voltage is applied and a second end of which is connected to a connection node between the output transistor and the synchronous rectification transistor; and a capacitor a first end of which is connected to a node from which the output voltage is extracted and a second end of which is connected to a node to which a standard voltage is applied, and generate the output voltage by stepping up the input voltage (tenth configuration).

To achieve the above object, according to another aspect of the present invention, a power supply device includes: an output transistor that generates a desired output voltage from an input voltage by being turned on and off; an error amplifier that generates an error voltage by amplifying a difference between a feedback voltage commensurate with the output voltage and a predetermined reference voltage; a soft-start circuit that generates a comparison voltage for soft starting, the comparison voltage starting to rise in response to a level change in an enable signal; a PWM comparator that compares the lower of the error voltage and the comparison voltage for soft starting with a predetermined slope voltage so as to generate a PWM signal having a duty corresponding to the comparison result; and means for turning the output transistor on and off by using the PWM signal (eleventh configuration).

It is preferable that the power supply device having the eleventh configuration described above further include: a reference voltage detection circuit that detects, each time the enable signal changes a level thereof, whether or not the reference voltage has risen; an output voltage detection circuit that detects, each time the reference voltage detection circuit finds the reference voltage to have risen, whether or not the output voltage has reached a predetermined threshold value; and a soft-start interruption circuit that, when the output voltage detection circuit finds the output voltage to have reached the predetermined threshold value, cuts off a transmission path through which the comparison voltage for soft starting is transmitted from the soft-start circuit to the PWM comparator (twelfth configuration).

It is preferable that the power supply device having the eleventh or twelfth configuration described above further include a clamp circuit that sets an upper limit value of the error voltage and increase the upper limit value of the error voltage stepwise after the level change in the enable signal (thirteenth configuration).

It is preferable that, in the power supply device having the thirteenth configuration described above, the clamp circuit monitor the comparison voltage for soft starting, and increase the upper limit value of the error voltage stepwise as the value of the voltage increases (fourteenth configuration).

It is preferable that, in the power supply device having the thirteenth configuration described above, the clamp circuit monitor a length of time that has passed since soft starting started and, when the length of passed time reaches a predetermined value, increase the upper limit value of the error voltage stepwise (fifteenth configuration).

It is preferable that the power supply device having one of the eleventh to fifteenth configurations further include: an inductor a first end of which is connected to a node to which the input voltage is applied and a second end of which is connected to a first end of the output transistor; a diode an anode of which is connected to the first end of the output transistor and a cathode of which is connected to a node from which the output voltage is extracted; and a capacitor a first end of which is connected to the node from which the output voltage is extracted and a second end of which is connected to a node to which a standard voltage is applied, and generate the output voltage by stepping up the input voltage (sixteenth configuration).

According to another aspect of the present invention, an electronic appliance includes: a battery serving as an electric power source of the appliance; a power supply device serving as means for converting an output of the battery; and a load circuit driven by the power supply device. Here, as the power supply device, the power supply device having one of the first to sixteenth configurations is provided (seventeenth configuration).

ADVANTAGES OF THE INVENTION

According to the present invention, the rise time of the output voltage can be shortened and the maximum current at start-up can be reduced.

LIST OF REFERENCE SYMBOLS

Figure 1:
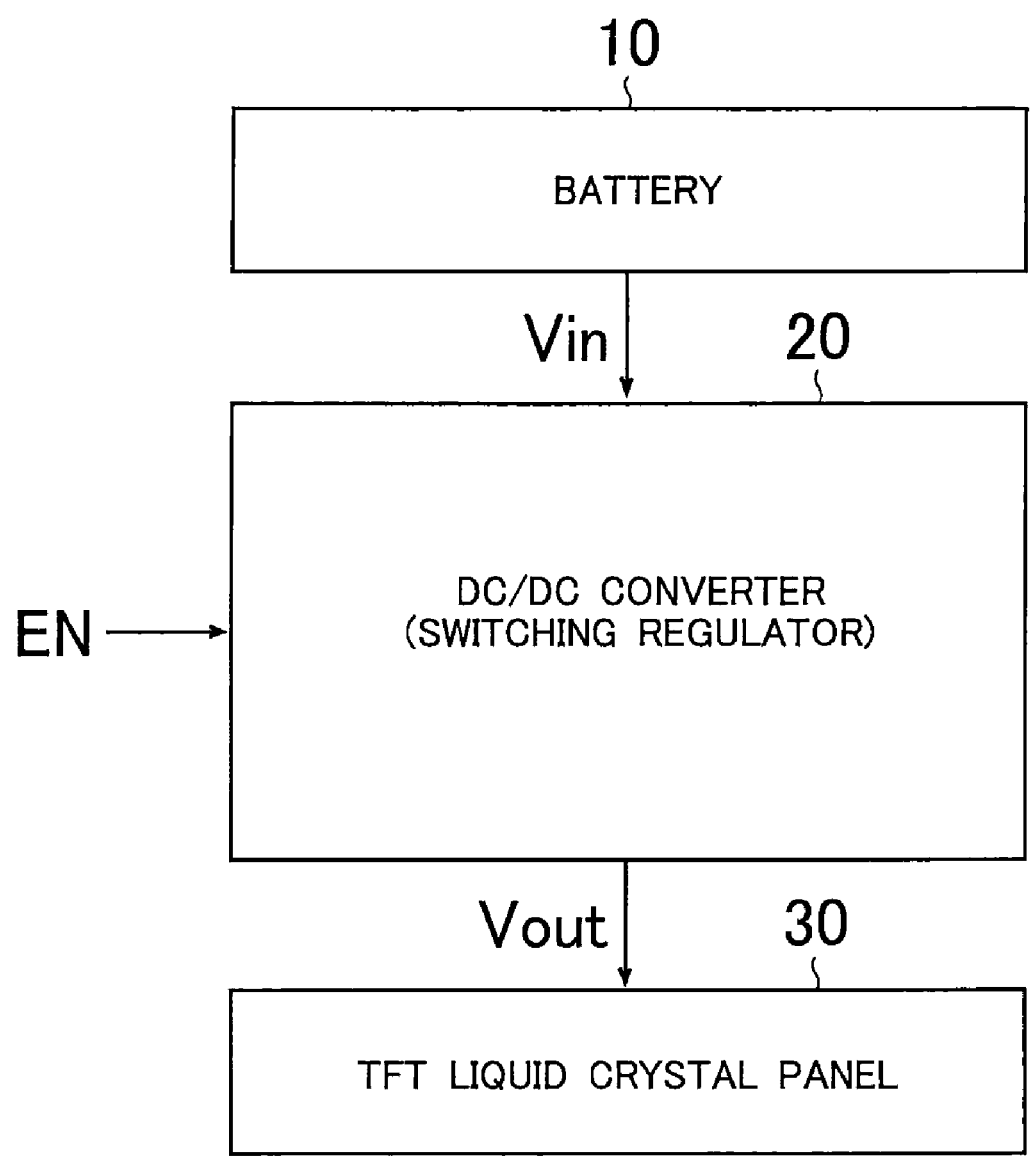
FIG. 1 A block diagram showing a mobile-phone unit embodying the present invention.

10 battery
20 DC/DC converter (switching regulator)
30 TFT liquid crystal panel
21, 21' switching power supply ICs
211, 211' switch driving circuits
212 output feedback circuit
213 phase compensation circuit
214 clamp circuit
215 soft-start circuit
216 reference voltage detection circuit
217 output voltage detection circuit
218 soft-start interruption circuit
N1 to N6 N-channel field effect transistors
P-channel field effect transistor
Q1 pnp-type bipolar transistor
R1 to R11 resistors
C1 to C3 capacitors
AMP amplifier
OSC oscillator
ADD adder
PCMP PWM comparator
FF, FF1 RS flip-flops
FF2 D-type flip-flop
ERR error amplifier
E1 DC voltage source
I1 constant current source
BUF1, BUF2 buffers
INV, INV1 to INV 3 inverters
SW switch
T1, T1$a$, T1$b$, T2 external terminals
Lex inductor (external)
Dex diode (external)

Cex capacitor (external)
Rex resistor (external)

BEST MODE FOR CARRYING OUT THE INVENTION

The following description discusses examples of how the present invention is applied to a DC/DC converter incorporated in a mobile-phone unit for the purpose of converting the output voltage of a battery to generate a driving voltage for driving different parts such as a TFT (thin film transistor) liquid crystal panel of the mobile-phone unit.

FIG. 1 is a block diagram showing a mobile-phone unit embodying the present invention (in particular, the power supply system for a TFT liquid crystal panel). As shown in the figure, the mobile-phone unit of this embodiment is provided with a battery 10 which is a device power source, a DC/DC converter 20 which is means for converting the output of the battery 10, and a TFT liquid crystal panel 30 which is means by which the mobile-phone unit achieves display. Needless to say, although not shown in the figure, the mobile-phone unit of this embodiment is provided with, in addition to the already mentioned components, a transmitter-receiver circuit portion, a speaker portion, a microphone portion, a display portion, an operation portion, a memory portion, and the like as means for realizing its essential functions (communication and other functions).

The DC/DC converter 20 generates a constant output voltage Vout from an input voltage Vin applied from the battery 10, and then supplies the output voltage Vout to the TFT liquid crystal panel 30 (to its backlight, in particular).

First, a description will be given of a first example of the configuration of the DC/DC converter 20 with reference to FIG. 2.

Figure 2:
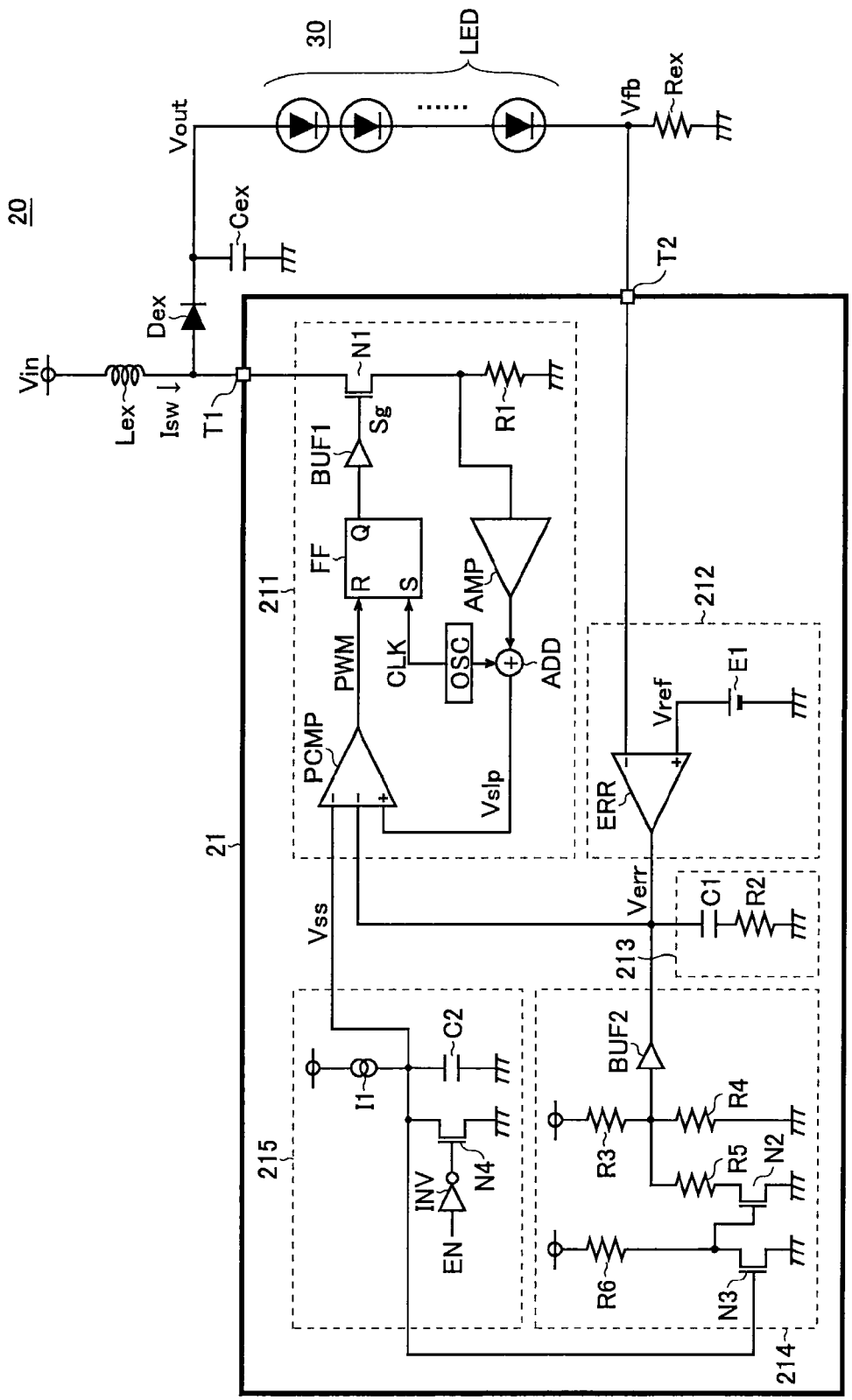
FIG. 2 A circuit diagram showing a first example of the configuration of a DC/DC converter 20.

FIG. 2 is a circuit diagram (partly presented as a block diagram) showing the first example of the configuration of the DC/DC converter 20.

As shown in this figure, the DC/DC converter 20 of this configuration is a step-up switching regulator (a chopper regulator) including a switching power supply IC 21, and further including, as externally fitted components, an inductor Lex, a diode Dex (a Schottky-barrier diode), a capacitor Cex, and a resistor Rex. The DC/DC converter 20 serves as means for supplying the output voltage Vout to, as the driving voltage for, a light-emitting-diode array (hereinafter, referred to as LED (light emitting diode)) provided in the backlight of the TFT liquid crystal panel 30.

The switching power supply IC 21 is provided with, in terms of circuit blocks, a switch driving circuit 211, an output feedback circuit 212, a phase compensation circuit 213, a clamp circuit 214, and a soft-start circuit 215, and is also provided with external terminals T1 and T2 as means for external electrical connection. In the switching power supply IC 21, in addition to the above mentioned circuit blocks, any other protection circuit block (e.g., a low-input malfunction prevention circuit, a heat protection circuit, or the like) may additionally be incorporated, if necessary.

The switch driving circuit 211 includes an N-channel field effect transistor N1, a resistor R1, an amplifier AMP, an oscillator OSC, an adder ADD, a PWM comparator PCMP, a reset-dominant RS flip-flop FF, and a buffer BUF1.

The output feedback circuit 212 includes an error amplifier ERR and a DC voltage source E1 such as a band gap power supply circuit which is not affected by ambient temperature.

The phase compensation circuit 213 includes a capacitor C1 and a resistor R2.

The clamp circuit 214 includes N-channel field effect transistors N2 and N3, resistors R3 to R6, and a buffer BUF2.

The soft-start circuit 215 includes an N-channel field effect transistor N4, a constant current source I1, a capacitor C2, and an inverter INV.

Next, a description will be given of the interconnection among the circuit components mentioned above.

In the switch driving circuit 211, the drain of the transistor N1 is connected to the external terminal T1. The source of the transistor N1 is grounded via the resistor R1 (several tens of mΩ), and is also connected to the input terminal of the amplifier AMP. A first input terminal of the adder ADD is connected to the output terminal of the amplifier AMP, and a second input terminal of the adder ADD is connected to a first output terminal (a triangular wave voltage output terminal) of the oscillator OSC. The non-inverting input terminal (+) of the PWM comparator PCMP is connected to the output terminal of the adder ADD. The set input terminal (S) of the RS flip-flop FF is connected to a second output terminal (a clock output terminal) of the oscillator OSC. The reset input terminal (R) of the RS flip-flop FF is connected to the output terminal of the PWM comparator PCMP. The output terminal (Q) of the RS flip-flop FF is connected to the gate of the transistor N1 via the buffer BUF1.

In the output feedback circuit 212, the inverting input terminal (−) of the error amplifier ERR is connected to the external terminal T2. The non-inverting input terminal (+) of the error amplifier ERR is connected to the positive terminal of the DC voltage source E1. The negative terminal of the DC voltage source E1 is grounded. The output terminal of the error amplifier ERR is connected to a first inverting input terminal (−) of the PWM comparator PCMP.

In the phase compensation circuit 213, a first end of the capacitor C1 is connected to the output terminal of the error amplifier ERR. A second end of the capacitor C1 is grounded via the resistor R2.

In the clamp circuit 214, a first end of the resistor R3 is connected to the power line. A second end of the resistor R3 is connected to the output terminal of the error amplifier ERR via the buffer BUF2, and is also connected to first ends of the resistors R4 and R5. A second end of the resistor R4 is grounded. A second end of the resistor R5 is connected to the drain of the transistor N2. The source of the transistor N2 is grounded. The gate of the transistor N2 is connected to the power line via the resistor R6, and is also connected to the drain of the transistor N3. The source of the transistor N3 is grounded.

In the soft-start circuit 215, a first end of the constant current source I1 of is connected to the power line. A second end of the constant current source I1 is connected to a second inverting input terminal (−) of the PWM comparator PCMP, and is connected as well to a first end of the capacitor C2, also to the gate of the transistor N3, and also to the drain of the transistor N4. A second end of the capacitor C2 and the source of the transistor N4 are both grounded. The gate of the transistor N4 is connected via the inverter INV to a node to which a power-on signal EN is applied.

Outside the switching power supply IC 21, the external terminal T1 is connected, via the inductor Lex (several tens of μH), to the output terminal (where the input voltage Vin is present) of the battery 10 and is also connected to the anode of the diode Dex. The cathode of the diode Dex is grounded via the capacitor Cex (several μF), and is also connected, as a node from which the output voltage Vout is extracted, to the anode of the LED array provided in the backlight of the TFT liquid crystal panel 30. The cathode of the LED array is grounded via the resistor Rex, and is also connected to the external terminal T2 of the switching power supply IC 21.

A detailed description will now be given of the basic operation (DC/DC conversion operation) of the DC/DC converter 20 configured as described above.

In the switch driving circuit 211, the transistor N1 serves as an output transistor that is turned on and off according to the output signal (a gate signal Sg) of the RS flip-flop FF.

When the transistor N1 is turned on, a switch current Isw flows through the inductor Lex toward the ground node via the transistor N1, and the electric energy of the switch current Isw is stored in the inductor Lex. Here, during the on-period of the transistor N1, if an electrical charge has already been stored in the capacitor Cex, a current from the capacitor Cex flows through the LED array serving as a load. Meanwhile, the potential at the external terminal T1 lowers approximately to the level of the ground potential, and as a result, the diode Dex is brought into a reverse-biased state. This prevents a current from flowing into the transistor N1 from the capacitor Cex.

On the other hand, when the transistor N1 is turned off, a counter electromotive voltage appears in the inductor Lex to discharge the electric energy that has been stored therein. Meanwhile, the diode Dex is brought into a forward-biased state, and thus the current flowing via the diode Dex flows into the LED array serving as a load, and also flows into the ground node via the capacitor Cex, charging the capacitor Cex. Through the repetition of the above described operation, a DC output stepped up and smoothed by the capacitor Cex is supplied to the LED array serving as the load.

In this way, the switching power supply IC 21 of this embodiment functions, turning a transistor N1 on and off to drive an inductor Lex that serves as an energy storage device, as a component of a chopper-type step-up circuit that generates an output voltage Vout by stepping up an input voltage Vin.

Incidentally, the switching power supply IC 21 of this embodiment is, for the purpose of realizing PWM brightness control of the LED array, so configured as to determine whether or not to perform a step-up operation according to whether the power-on signal EN (the step-up operation permission signal) is enabled or disabled.

Next, a detailed description will be given of the output feedback control of the DC/DC converter 20 configured as described above.

In the output feedback circuit 212, the error amplifier ERR generates an error voltage Vrr by amplifying the difference between a feedback voltage Vfb (corresponding to the actual level of the output voltage Vout) extracted from the first end of the resistor Rex and a reference voltage Vref (corresponding to the target level of the output voltage Vout) generated by the DC voltage source E1. Thus, the farther the output voltage Vout is lower than the target value thereof, the higher the voltage level of the error voltage Verr is.

On the other hand, in the switch driving circuit 211, the PWM comparator PCMP compares the lower of the error voltage Verr, which is applied to the first inverting input end (−) of PCMP and the soft-start voltage Vss, which is applied to the second inverting input end (−) of PCMP, and the slope voltage Vslp (the output voltage of the adder ADD that it generates by adding up a standard rectangular wave voltage (a rectangular wave or a ramp wave) and the output voltage of the amplifier AMP), which is applied to the non-inverting input end (+) of PCMP in order to generate a PWM signal having a duty corresponding to the comparison result. Thus, the logic level of the PWM signal is low when the lower of the error voltage Verr and the soft-start voltage Vss is higher than the slope voltage Vslp, and the logic level of the PWM signal is high when the lower of the error voltage Verr and the soft-start voltage Vss is lower than the slope voltage Vslp.

The on-duty of the PWM signal (the ratio of the on-period of the transistor N1 per unit period) changes continuously according to the level of the lower of the error voltage Verr and the soft-start voltage Vss relative to the level of the slope voltage Vslp.

While the logic level of the PWM signal (the reset signal to the RS flip-flop FF) is kept low, the logic level of the gate signal Sg of the transistor N1 is kept high starting with a rising edge of a clock signal CLK (several hundred kHz to several MHz) applied to the set terminal (S) of the RS flip-flop FF; thus, the transistor N1 remains on. On the other hand, while the logic level of the PWM signal is kept high, the logic level of the gate signal Sg is kept low regardless of the clock signal CLK; thus, the transistor N1 remains off.

As described above, in the DC/DC converter 20, which employs a peak current mode control, the operation of the transistor N1 is controlled based not only on the monitoring result of the output voltage Vout but also on the monitoring result of the switch current Isw flowing into the transistor N1. Thus, with the DC/DC converter 20 of this embodiment, even when the error voltage Verr cannot follow an abrupt load variation, the operation of the transistor N1 can be directly controlled according to the monitoring result of the switch current Isw flowing into the transistor N1, and thus the variation of the output voltage Vout can be effectively reduced. As a result, with the DC/DC converter 20 of this embodiment, the capacity of the capacitor Cex does not need to be increased, and thus unnecessary increase in cost and in the size of the capacitor Cex can be avoided.

Next, a detailed description will be given of the soft-start control of the DC/DC converter 20 configured as described above.

Immediately after the DC/DC converter 20 is started up, since the output voltage is zero, the error voltage Verr is extremely high. Thus, if the PWM signal is generated according to the comparison result between the error voltage Verr and the slope voltage Vslp, the duty of the PWM signal becomes so large that an overcurrent flows into the load or the inductor Lex.

To avoid this, in the DC/DC converter 20 of this embodiment, as described above, in addition to the error voltage Verr, the soft-start voltage Vss is inputted to the PWM comparator PCMP, and when the soft-start voltage Vss is lower than the error voltage Verr, the duty of the PWM signal is determined, irrespective of the error voltage Verr, according to the comparison result between the lower soft-start voltage Vss and the slope voltage Vslp.

In this embodiment, in response to the power-on signal EN being enabled (turned to high level), the soft-start circuit 215 turns off the transistor N4, which is for discharging the capacitor C2, so that a predetermined constant current flows into the capacitor C2; thereby the soft-start circuit 215 produces the soft start voltage Vss such that it starts to rise gently after the start-up of the device.

With such a configuration including the soft-start circuit 215 as described above, it is possible to prevent an overcurrent from flowing into the load or into the inductor Lex when the device is started up.

Next, a detailed description will be given of start-up current reducing control (multi-stage clamp control of the error signal Verr) during the soft-start period, as a distinctive feature of the present invention, with reference to FIG. 3, in addition to FIG. 2 already referred to.

Figure 3:
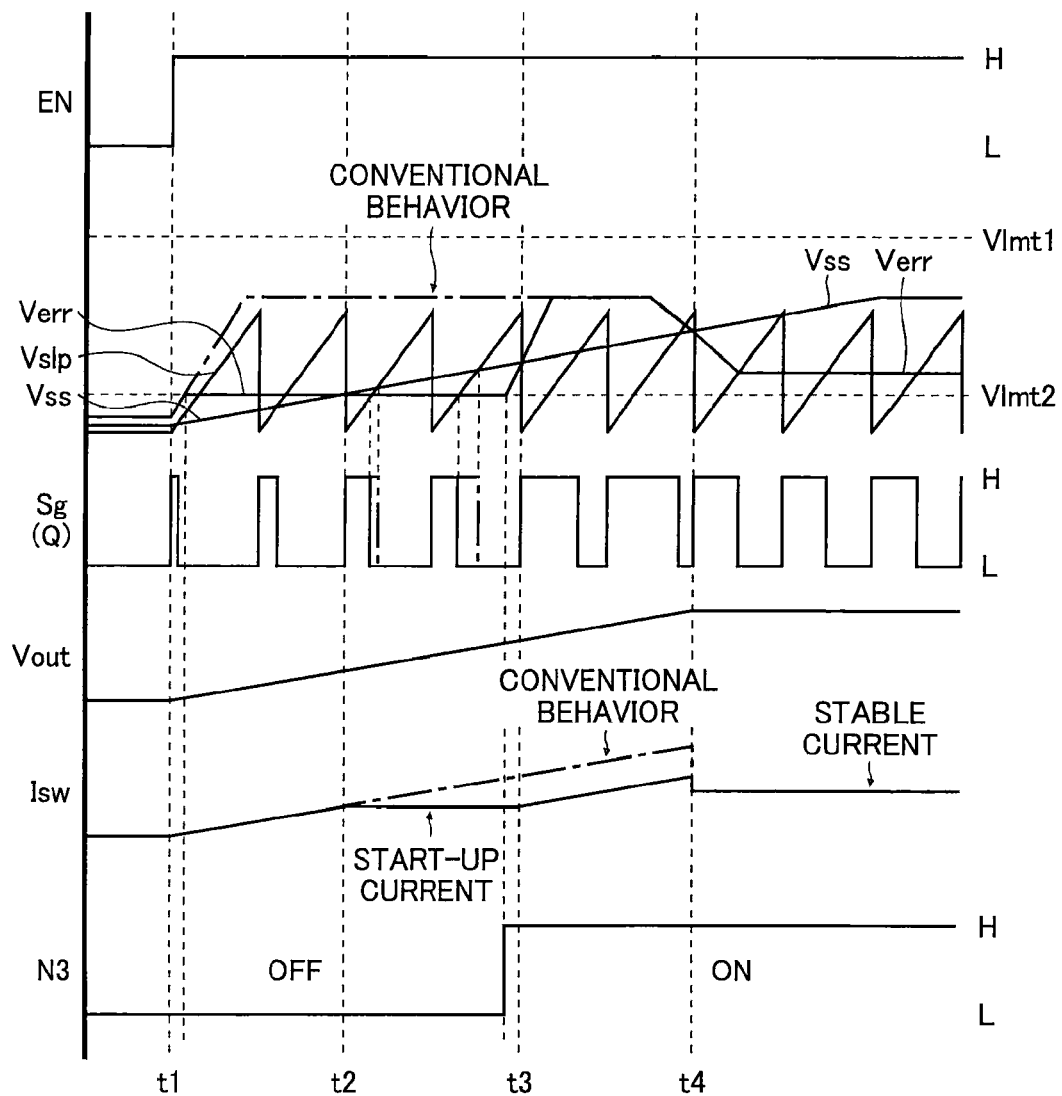
FIG. 3 A diagram illustrating a star-up current reducing control.
Figure 7:
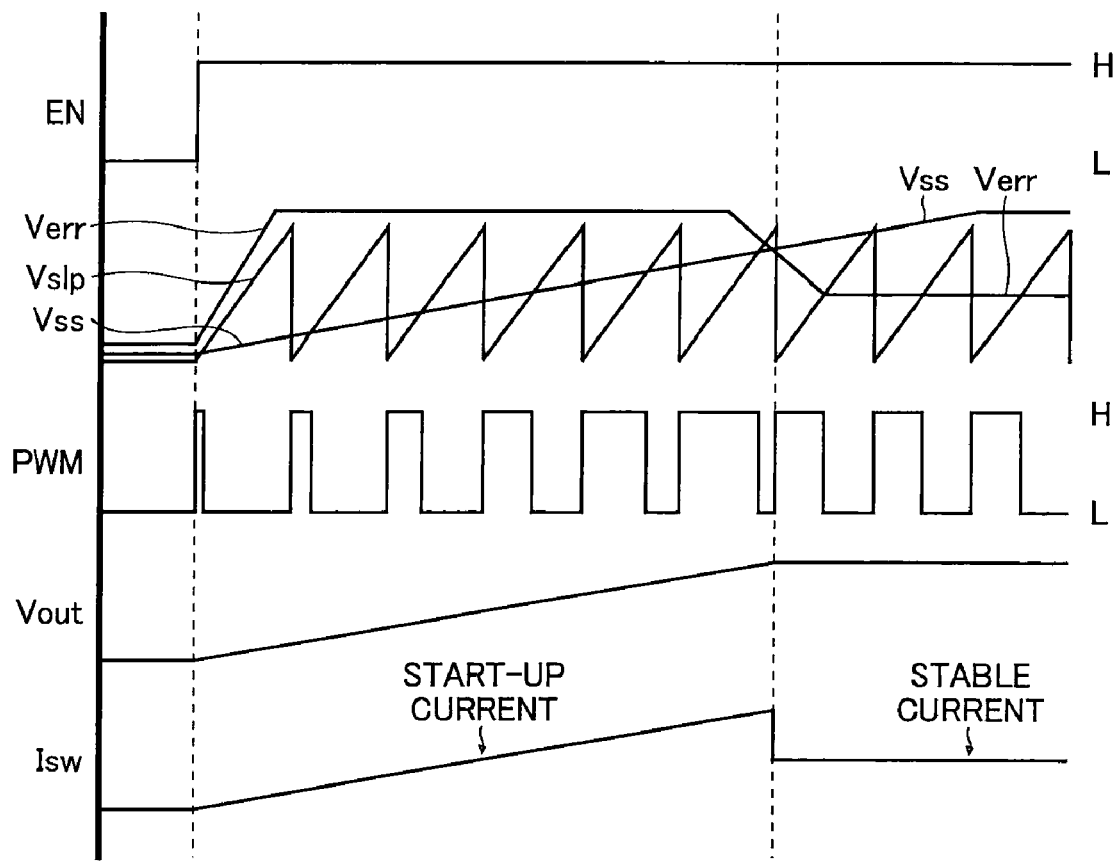
FIG. 7 A diagram illustrating a conventional soft starting.

FIG. 3 is a diagram illustrating the start-up current reducing control. FIG. 3 schematically shows, along the vertical axis, the behavior (voltage and current waveforms) of the power-on signal EN, the error voltage Verr, the slope voltage Vslp, the soft-start voltage Vss, the gate signal Sg, the output voltage Vout, and the switch current Isw, as plotted against the horizontal axis, which represents the passage of time t. Moreover, in FIG. 3, solid lines show the behavior observed when the present invention is applied, while the dash-and-dot lines show, for comparison, the behavior observed conventionally (i.e., the behavior observed when, as in FIG. 7, no multi-stage clamp control is performed).

When, at time t1, the power-on signal EN is enabled (turned to high level), in the soft-start circuit 215, the transistor N4 is turned off and the soft-start voltage Vss starts rising. Meanwhile, in the clamp circuit 214, the transistor N3 is kept off and hence the transistor N2 is kept on until the soft-start voltage Vss reaches the level of the on-state voltage of the transistor N3 (the threshold voltage necessary for the transistor N3 to turn from off to on).

Thus, the upper limit value Vlmt of the error voltage Verr is, by a resistive divider circuit composed of the resistor R3 and the resistors R4 and R5, set at a second upper limit value Vlmt2 which is lower than a first upper limit value Vlmt1, used in steady state operation, and the error voltage Verr is kept at the second upper limit value Vlmt2 until the soft-start voltage Vss reaches the level of the on-state voltage of the transistor N3.

Incidentally, during the period from time t1 when the power-on signal EN is enabled until time t2 when the soft-start voltage Vss reaches the level of the error voltage Verr kept at the second upper limit value Vlmt2, the PWM comparator PCMP determines, irrespective of the error voltage Verr, the duty of the PWM signal according to a comparison result between a lower soft-start voltage Vss and the slope voltage Vlsp.

At time t2, the soft-start voltage Vss reaches the level of the error voltage Verr kept at the second upper limit value Vlmt2; thereafter, until the error voltage Verr exceeds the soft-start voltage Vss again at time t3, the PWM comparator PCMP determines the duty of the PWM signal, irrespective of the soft-start voltage Vss, according to the comparison result between the error voltage Verr kept at the lower second upper limit value Vlmt2 and the slope voltage Vslp.

Thus, the duty of the PWM signal during the period between times t2 and t3 is smaller than in the case where no multi-stage clamp control is performed. In this way, the switch current Isw is reduced.

On the other hand, after the soft-start voltage Vss starts rising at time t1, when the soft-start voltage Vss reaches the level of the on-state voltage of the transistor N3, in the clamp circuit 214, the transistor N3 is turned on, and hence the transistor N2 is turned off. Consequently, at this time, the clamping at the second upper limit value Vlmt2 is released, and the upper limit value Vlmt of the error voltage Verr is set at the first upper limit value Vlmt1 by the resistive divider circuit composed exclusively of the resistors R3 and R4. Thus, the error voltage Verr again starts rising up to a voltage level corresponding to the feedback voltage Vfb.

Then, at time t3 when the error voltage Verr reaches the level of the soft-start voltage Vss, the PWM comparator PCMP determines the duty of the PWM signal, irrespective of the error voltage Verr, according to the comparison result between the lower soft-start voltage Vss and the slope voltage Vslp.

Thereafter, as the output voltage Vout approaches its target value, the error voltage Verr starts decreasing; when this falls below the soft-start voltage Vss at time t4, the PWM comparator PCMP comes to determine the duty of the PWM signal, irrespective of the soft-start voltage Vss, according to the comparison result between the lower of the error voltage Verr and the slope voltage Vslp. That is, at time t4, the soft-start period ends.

As described above, in this embodiment, after the device is started up, the clamp circuit 214 increases the upper limit value of Vlmt of the error voltage Verr stepwise.

With this configuration, since the overcurrent limit level of the switch current Isw can be controlled appropriately according to the upper limit value Vlmt of the error voltage Verr, it is possible, as shown in FIG. 3, to reduce the difference between the maximum current at a start-up (the maximum current that flows immediately before the output voltage Vout becomes stable) and the stable current (the steady-state current that flows after the output voltage Vout becomes stable).

Thus, with the DC/DC converter 20 of this embodiment, it is possible to reduce unnecessary consumption of electric power at the start-up of the device. Furthermore, with the DC/DC converter 20 of this embodiment, it is possible to quicken the rise of the soft-start voltage Vout, and thereby to shorten the rise time of the output voltage Vout.

Moreover, the clamp circuit 214 of this embodiment monitors the soft-start voltage Vss and increases the upper limit value Vlmt of the error voltage Verr stepwise as the soft-start voltage Vss increases. With this configuration, it is possible to realize the multi-stage clamp control described above with as small an increase in circuit scale as possible.

Next, a second example of the configuration of the DC/DC converter 20 will be described with reference to FIG. 4.

Figure 4:
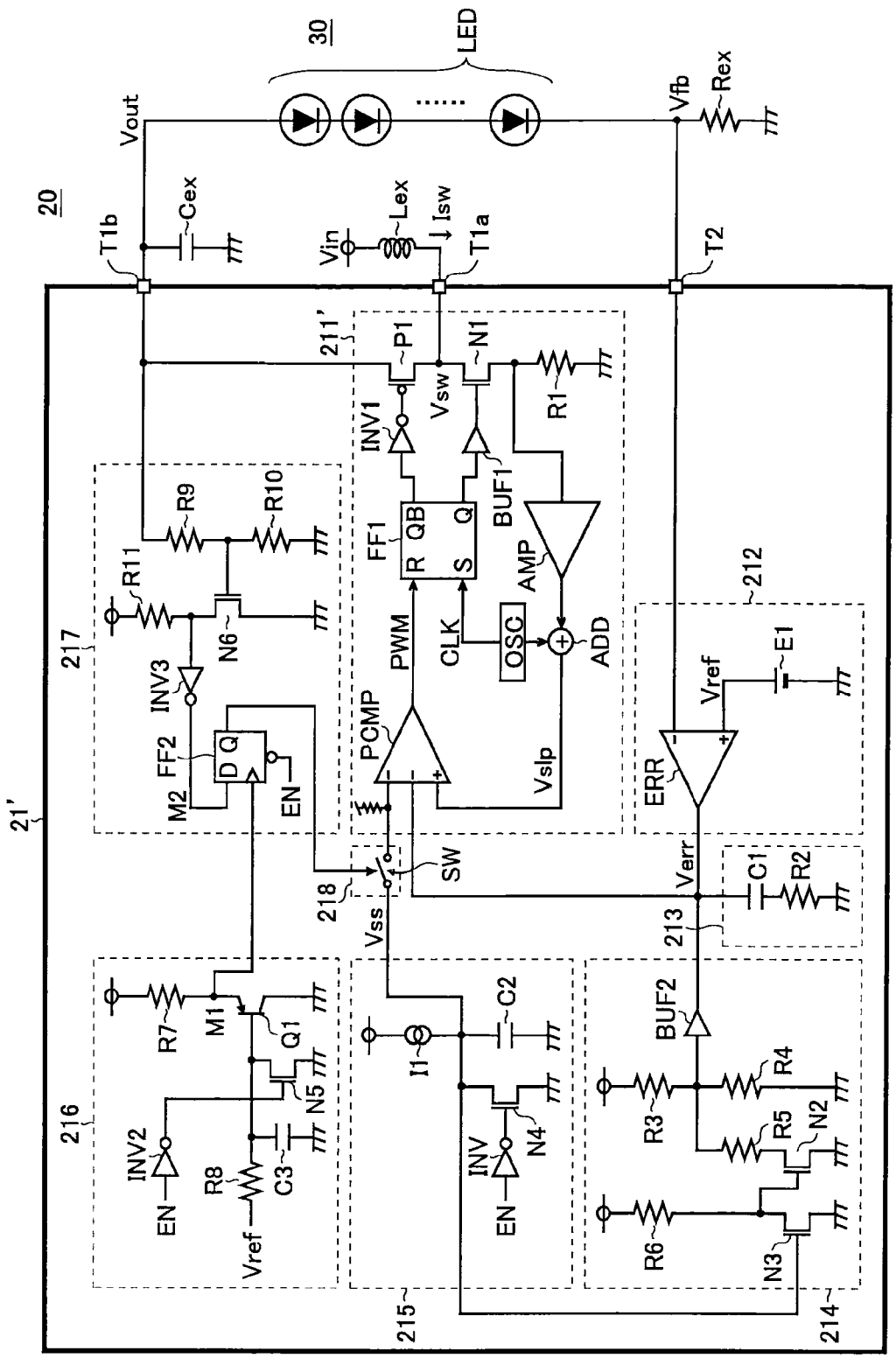
FIG. 4 A circuit diagram showing a second example of the configuration of the DC/DC converter 20.

FIG. 4 is a circuit diagram (partly presented as a block diagram) showing the second example of the configuration of the DC/DC converter 20.

As shown in FIG. 4, the DC/DC converter 20 of this embodiment is a step-up switching regulator (a chopper regulator) including a switching power supply IC 21', and further including, as externally fitted components, an inductor Lex, a capacitor Cex, and a resistor Rex. The DC/DC converter 20 serves as means for supplying the output voltage Vout to, as the driving voltage for, an LED array provided in the backlight of the TFT liquid crystal panel 30.

The switching power supply IC 21' is provided with, in terms of circuit blocks, a switch driving circuit 211', an output feedback circuit 212, a phase compensation circuit 213, a clamp circuit 214, a soft-start circuit 215, a reference voltage detection circuit 216, an output voltage detection circuit 217, and a soft-start interruption circuit 218, and is also provided with external terminals T1a, T1b, and T2 as means for external electrical connection. In the switching power supply IC 21', in addition to the above mentioned circuit blocks, any other protection circuit block (e.g., a low-input malfunction prevention circuit, a heat protection circuit, or the like) may additionally be incorporated, if necessary.

The switch driving circuit 211' includes a P-channel field effect transistor P1, an N-channel field effect transistor N1, a resistor R1, an amplifier AMP, an oscillator OSC, an adder ADD, a PWM comparator PCMP, a reset-dominant RS flip-flop FF, an inverter INV1, and a buffer BUF1.

The output feedback circuit 212, the phase compensation circuit 213, the clamp circuit 214, and the soft-start circuit 215 each include the same circuit components as do their counterparts in the first example of the configuration described above.

The reference voltage detection circuit 216 includes an N-channel field effect transistor N5, a pnp-type bipolar transistor Q1, resistors R7 and R8, a capacitor C3, and an inverter INV2.

The output voltage detection circuit 217 includes an N-channel field effect transistor N6, resistors R9 to R11, a D-type flip-flop FF2, and an inverter INV3.

The soft-start interruption circuit 218 includes a switch SW as means for cutting off a soft-start voltage Vss.

Next, a description will be given of the interconnection among the circuit components described above.

In the switch driving circuit 211', the drain of the transistor P1 is connected to the external terminal T1b. The source of the transistor P1 is connected to the external terminal T1a. The drain of the transistor N1 is connected to the external terminal T1a. The source of the transistor N1 is grounded via the resistor R1 (several tens of mΩ), and is also connected to the input terminal of the amplifier AMP. A first input terminal of the adder ADD is connected to the output terminal of the amplifier AMP, and a second input terminal of the adder ADD is connected to the first output terminal (the triangular wave voltage output terminal) of the oscillator OSC. A non-inverting input terminal (+) of the PWM comparator PCMP is connected to the output terminal of the adder ADD. The set input terminal (S) of the RS flip-flop FF1 is connected to the second output terminal (the clock output terminal) of the oscillator OSC. The reset input terminal (R) of the RS flip-flop FF1 is connected to the output terminal of the PWM comparator PCMP. The inverting output terminal (QB) of the RS flip-flop FF1 is connected to the gate of the transistor P1 via the inverter INV1. The output terminal (Q) of the RS flip-flop FF1 is connected to the gate of the transistor N1 via the buffer BUF1.

The interconnection among the output feedback circuit 212, the phase compensation circuit 213, the clamp circuit 214, and the soft-start circuit 215 is the same as in the first example of the configuration described above.

In the reference voltage detection circuit 216, a first end of the resistor R7 is connected to the power line. A second end of the resistor R7 is connected to the emitter of the transistor Q1. The collector of the transistor Q1 is grounded. The base of the transistor Q1 is connected to the drain of the transistor N5, also to a first end of the capacitor C3, and also to a first end of the resistor R8. The source of the transistor N5 and a second end of the capacitor C3 are both grounded. The gate of the transistor N5 is connected via the inverter INV2 to a node to which the enable signal EN is applied. A second end of the resistor R8 is connected to a node to which the reference voltage Vref is applied.

In the output voltage detection circuit 217, a first end of the resistor R9 is connected to the external terminal T1b. A second end of the resistor R9 is grounded via the resistor R10, and is also connected to the gate of the transistor N6. The source of the transistor N6 is grounded. The drain of the transistor N6 is connected to the power line via the resistor R11, and is also connected to the data input terminal (D) of the D-type flip-flop FF2 via the inverter INV3. The clock input terminal of the D-type flip-flop FF2 is connected to the emitter of the transistor Q1 constituting the reference voltage detection circuit 216. The reset input terminal of the D-type flip-flop FF2 is connected to a node to which the enable signal EN is applied. The output terminal (Q) of the D-type flip-flop FF2 is connected to the control terminal of the switch SW constituting the soft-start interruption circuit 218.

In the soft-start interruption circuit 218, a first end of the switch SW is connected to a first end of the capacitor C2 constituting the soft-start circuit 215. A second end of the switch SW is connected to the second inverting input end (−) of the PWM comparator PCMP constituting the switch driving circuit 211'.

Outside the switching power supply IC 21', the external terminal T1a is connected, via the inductor Lex (several tens of μH), to the output node (where the input voltage Vin is present) of the battery 10. The external terminal T1b is grounded via the capacitor Cex (several tens of μF), and is also connected, as a node from which output voltage Vout is extracted, to the anode of the LED array provided in the backlight of the TFT liquid crystal panel 30. The cathode of the LED array is grounded via the resistor Rex, and is also connected to the external terminal T2 of the switching power supply IC 21'.

A detailed description will now be given of the basic operation (a DC/DC conversion operation) of the DC/DC converter 20 configured as described above.

In the switch driving circuit 211', the transistor N1 serves as an output transistor that is turned on and off according to the output signal (the output signal Q) of the buffer BUF1, and the transistor P1 serves as a synchronous rectification transistor that is turned on and off according to the output signal (the inversion of the inverted output signal QB) of the inverter INV1. The RS flip-flop FF1, in order to produce the output voltage Vout by stepping up the input voltage Vin, controls the switching of the transistor N1 and the switching of the transistor P1 complementarily to each other.

More specifically, while the logic level of the PWM signal (the reset signal to the RS flip-flop FF1) is kept low, the logic levels of the gate signals of the transistors N1 and P1 are both kept high starting with a rising edge of a clock signal CLK (several hundred kHz to several MHz) applied to the set terminal (S) of the RS flip-flop FF1; thus, the transistor N1 is turned on and the transistor P1 is turned off. On the other hand, while the logic level of the PWM signal is kept high, the logic levels of the gate signals of the transistors N1 and P1 are both kept low, regardless of the clock signal CLK; thus, the transistor N1 remains off and the transistor P1 remains on. That is, in order to produce the output voltage Vout from the input voltage Vin, the transistors N1 and P1 are turned on and off complementarily to each other according to the above mentioned PWM signal.

It should be understood that the term "complementarily" used in this specification covers not only cases where the turning on and off of the transistor N1 and that of the transistor P1 take place exactly oppositely to each other but also cases where, from the perspective of preventing a through current, the turning on and off of the transistor N1 takes place with a predetermined delay relative to that of the transistor P1.

When the transistor N1 is turned on, a switch current Isw flows through the inductor Lex toward the ground node via the transistor N1, and thus the electric energy of the switch current Isw is stored in the inductor Lex. Here, if, during the on-period of the transistor N1, an electrical charge has already been stored in the capacitor Cex, a current from the capacitor Cex flows into the LED array. Meanwhile, the transistor P1 serving as a synchronous rectifier device is turned off complementarily to the on state of the transistor N1, and thus no current flows into the transistor N1 from the capacitor Cex.

On the other hand, when the transistor N1 is turned off, a counter electromotive voltage appears in the inductor Lex to discharge the electric energy that has been stored therein. Meanwhile, since the transistor P1 is turned on complementarily to the off state of the transistor N1, a current that flows from the external terminal T1a via the transistor P1 into the LED array serving as the load also flows into the ground node via the capacitor Cex, charging the capacitor Cex. Through the repetition of the above described operation, a DC output smoothed by the capacitor Cex is supplied to the LED array serving as the load.

Thus, the switching power supply IC 21' of this embodiment drives the inductor Lex, which is an energy storage device, by controlling the on/off states of the transistors N1 and P1, and thereby serves as a component of a chopper-type step-up circuit that generates the output voltage Vout by stepping up the input voltage Vin.

Furthermore, the switching power supply IC 21' of this embodiment is, for the purpose of realizing PWM brightness control of the LED array, so configured as to determine whether or not to perform step-up operation according to whether the enable signal EN (the step-up operation permission signal) is enabled or disabled.

Figure 5:
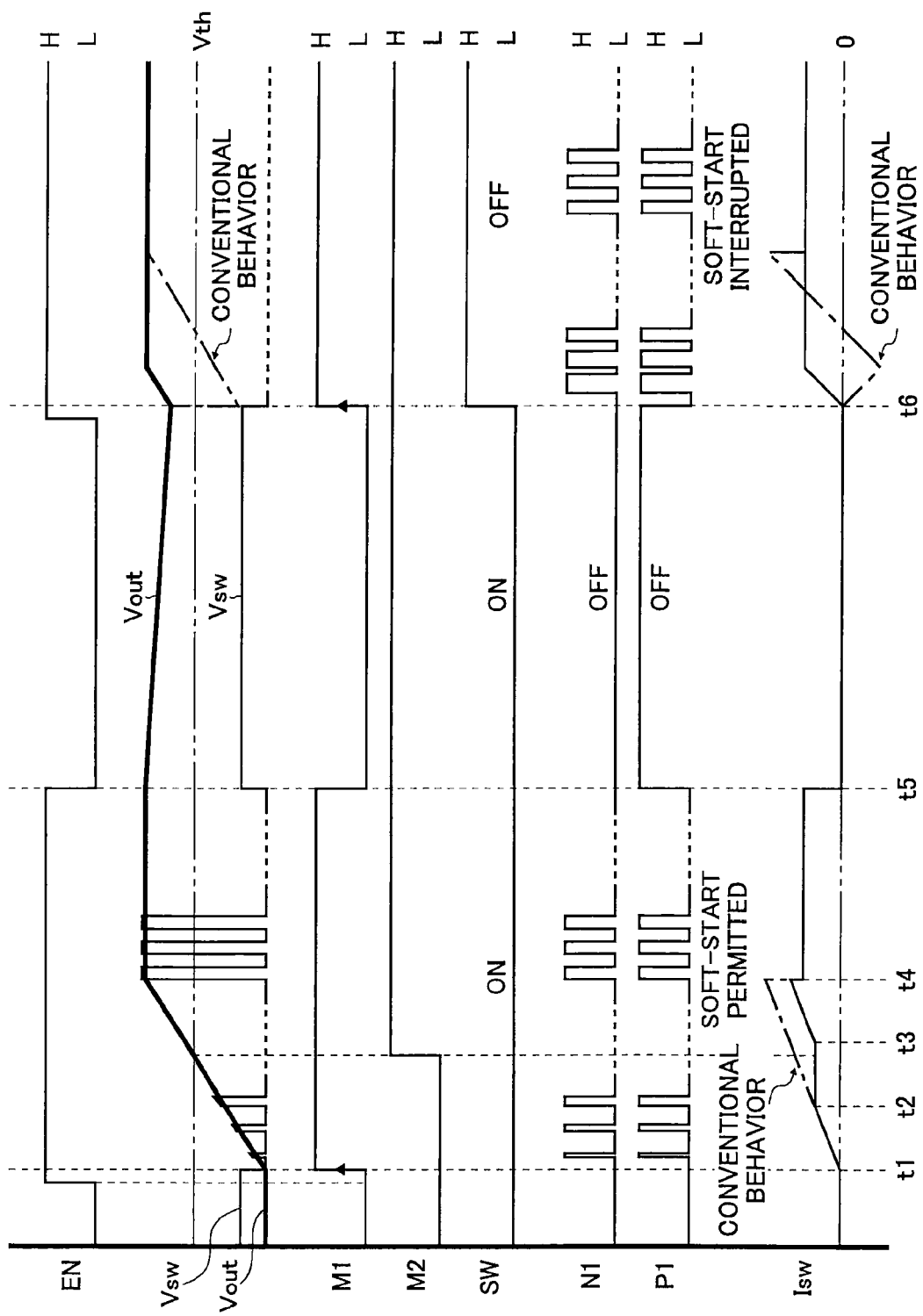
FIG. 5 A diagram illustrating a soft-start interruption control.

Incidentally, since the output feedback control, the soft-start control, and the start-up current reducing control (the multi-stage clamp control of an error voltage Verr) by the DC/DC converter 20 configured as described above are similar to those by the DC/DC converter 20 in the already discussed first example of the configuration, overlapping description will be omitted, and the following description will discuss in detail the soft-start interruption control, as another distinctive feature of the present invention, with reference to FIG. 5 as well as to FIG. 4 already referred to.

Figure 8:
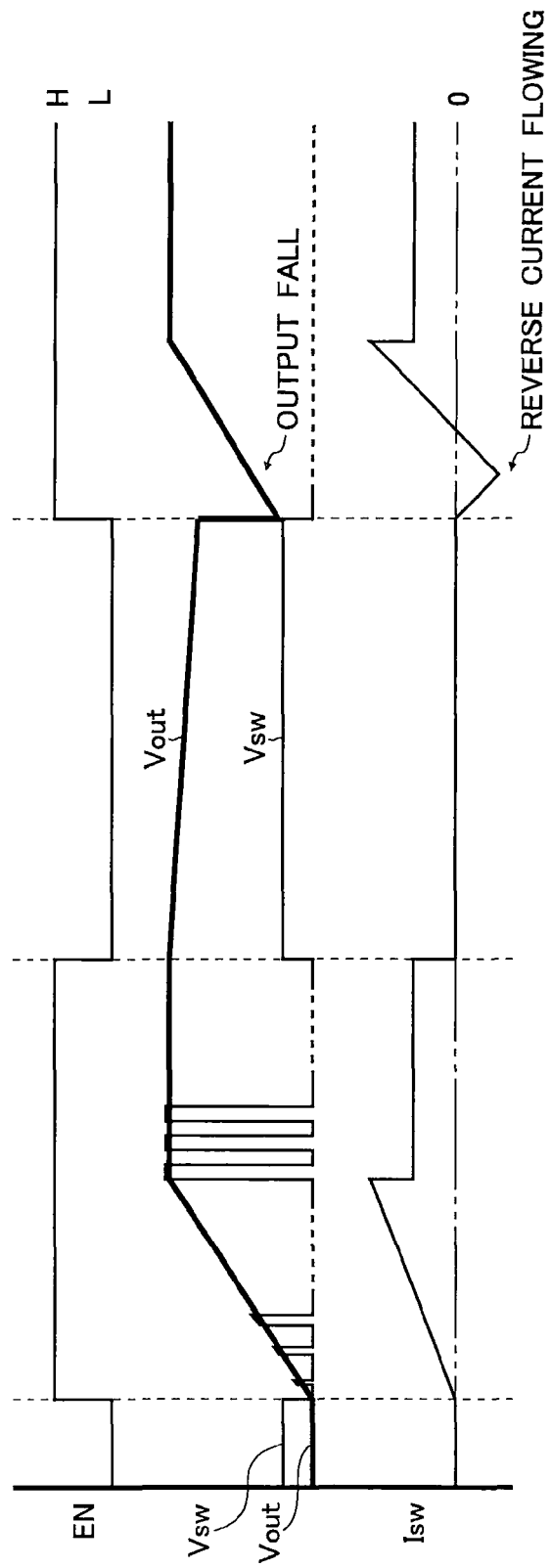
FIG. 8 A diagram illustrating how the response of the output voltage Vout lowers.

FIG. 5 is a diagram illustrating the soft-start interruption control. FIG. 5 schematically shows, along the vertical axis, the behavior (voltage or current waveforms) of the enable signal EN, the output voltage Vout, the switch voltage Vsw (the voltage that appears at the connection node between the output transistor N1 and the synchronous rectification transistor P1), the first monitor signal M1, the second monitor signal M2, the switch SW control signal, the gate signals of the transistors N1 and P1, and the switch current Isw, as plotted against the horizontal axis, which represents the passage of time t. Times t1 to t4 indicated in FIG. 5 along the horizontal axis are identical to times t1 to t4 indicated along the horizontal axis in FIG. 3. Moreover, in FIG. 5, solid lines show the behavior observed when the present invention is applied, while the dash-and-dot lines show, for comparison, the behavior observed conventionally (i.e., the behavior observed when, as in FIG. 8, no soft-start interruption control is performed).

At initial start-up of the device, if the enable signal EN is enabled before time t1, in the reference voltage detection circuit 216, the transistor N5 is turned off from on. Thus, after the reference voltage Vref rises to a sufficient level, the capacitor C3 starts to be charged; when the voltage charged in the capacitor C3 reaches the level of the off voltage of the transistor Q1, the transistor Q1 is turned on from off. Meanwhile, the logic level of a first monitor signal M1 (the emitter voltage of the transistor Q1) rises from low to high.

On the other hand, in the output voltage detection circuit 217, the transistor N6 is kept off until it is turned on when its gate voltage (a divided voltage of the output voltage Vout) reaches the level of the on voltage of the transistor N6. Therefore, the second monitor signal M2, which is obtained by inverting the logic of a voltage signal extracted from the drain of the transistor N6, is a binary logic signal whose logic level is kept low until the output voltage Vout reaches a predetermined threshold voltage Vth and is then changed to high.

In the output voltage detection circuit 217, the D-type flip-flop FF2 is so configured as to latch and output the second monitor signal M2, which is a data signal, using the first monitor signal M1 as a clock signal and the rising edge thereof as a trigger.

Here, at time t1, since, although the enable signal EN is enabled and the logic level of the first monitor signal M1 has risen to high, the output voltage Vout has not reached the threshold voltage Vth yet, the logic level of the second monitor signal M2 is kept low.

Therefore, a low logic-level control signal is applied to the control terminal of the switch SW constituting the soft-start interruption circuit 218, and the switch SW, based on the control signal, makes the soft-start circuit 215 conduct to the PWM comparator PCMP so as to form a transmission path of the soft-start voltage Vss between the soft-start circuit 215 and the PWM comparator PCMP (on state). Thus, at initial start-up of the device, the soft-start operation described above is performed. Incidentally, at initial start-up of the device, since the output voltage Vout is lower than the switch voltage Vsw, there is no risk of a reverse current from the LED array.

Then, when the enable signal EN is disabled at time t5 after going through times t2, t3, and t4, the transistor N5 is turned on from off in the reference voltage detection circuit 216. Thus, the voltage charged in the capacitor C3 is discharged, and the transistor Q1 is turned on from off. Meanwhile, the logic level of the first monitor signal M1 falls from high to low.

Also, when the enable signal EN is disabled, in the soft-start circuit 215, the transistor N4 is turned on from off. Consequently, the voltage charged in the capacitor C2 is discharged, and the soft-start voltage Vss is reduced to the zero level. This makes the transistors N1 and P1 stop operating, and the output voltage Vout starts decreasing gradually. However, so long as the output voltage Vout is equal to or higher than the above mentioned threshold voltage Vth, the transistor N6 in the output voltage detection circuit 217 remains on, and thus the logic level of the second monitor signal M2 remains high.

Then, when the enable signal EN is enabled again at time t6, the transistor N5 in the reference voltage detection circuit 216 is turned off from on, and the logic level of the first monitor signal M1 rises from low to high in a similar fashion as described above.

If, as shown in FIG. 5, the output voltage is not lower than the threshold voltage Vth at this time point, the second monitor signal M2 whose logic level is kept high is latched and outputted in the output voltage detection circuit 217. Therefore, a high-level control signal is applied to the control terminal of the switch SW, and the switch SW, based on the control signal, cuts off the transmission path of the soft-start voltage Vss from the soft-start circuit 215 to the PWM comparator PCMP (off state).

In this way, at start-up such as the second or later start-up, when the output voltage Vout has not been reduced low enough, the above described soft-start operation is interrupted, and in the PWM comparator PCMP of the switch driving circuit 211', the duty of the PWM signal is determined according to the comparison result between the error voltage Verr and the slope voltage Vslp, irrespective of the soft-start voltage Vss.

As described above, the DC/DC converter 20 of this embodiment includes: the reference voltage detection circuit 216 that detects, each time the enable signal EN is enabled, whether or not the reference voltage Vref has risen; the output voltage detection circuit 217 that detects, each time the reference voltage detection circuit 216 finds the reference voltage Vref to have risen, whether or not the output voltage Vout has reached a predetermined threshold voltage Vth; and the soft-start interruption circuit 218 that cuts off the soft-start voltage Vss transmission path from the soft-start circuit 215 to the PWM comparator PCMP when the output voltage detection circuit 217 finds the output voltage Vout to have reached the predetermined threshold voltage Vth.

With this configuration, at the second or later start-up, when the output voltage Vout is higher than the switch voltage Vsw, it is possible to interrupt the soft-start operation, and thereby to reduce the on-period of the synchronous rectification transistor P1. That is, with this configuration, it is possible to reduce the reverse flow of the switch current Isw, and thereby to prevent the output voltage Vout from falling abruptly; thus, it is possible to shorten the time that the voltage Vout takes to rise back to a desired level, and thus to realize an improved response speed of the output voltage Vout to the enable signal EN (in this embodiment, an improved on/off frequency of the LED array).

The interruption of soft starting may invite the risk of an increased amount of start-up current flowing at the second or later start-up. This risk, however, can be prevented by the start-up current reducing control (multi-stage clamp control) described already.

With the configuration of the embodiment discussed above where the first monitor signal M1 serving as the reference voltage detection signal is used as the trigger for determining whether or not to perform soft-start operation, it is possible to improve the stability of operation at initial start-up as compared with a configuration where the enable signal EN itself serves as the trigger.

In the second example of the configuration described above, it is assumed that the present invention is applied to a synchronous-rectification-type power supply device. This, however, is not meant to limit the application of the present invention to such an embodiment, and it should be understood that the present invention is applicable to a power supply device in which a diode is used instead of a synchronous rectification transistor, as in the first example of the configuration described above. In this case, it is preferable that the anode of the diode be connected to the drain of the output transistor N1, and the cathode of the diode be connected to the node from which the output voltage Vout is extracted.

In the embodiment described above, it is assumed that the present invention is applied to a DC/DC converter that is incorporated in a mobile-phone unit and generates driving voltages for different parts of the unit by converting the output voltage from a battery. This, however, is not meant to limit the application of the present invention in any manner, and it should be understood that the present invention generally applies in power supply devices that generate a desired output voltage from an input voltage, and electric appliances provided therewith.

The present invention may be carried out with any configuration other than specifically described above as an embodiment, and permits any variations and modifications within the spirit thereof.

In the embodiment described above, configurations are dealt with in which, for example, the upper limit value Vlmt of the error voltage Verr is variably controlled in two stages. This, however, is not meant to limit the configuration of the present invention in any manner, and it should be understood that a configuration may be adopted in which the upper limit value Vlmt of the error voltage Verr is variably controlled in three or more stages (multi-stage clamp control).

Figure 6A:
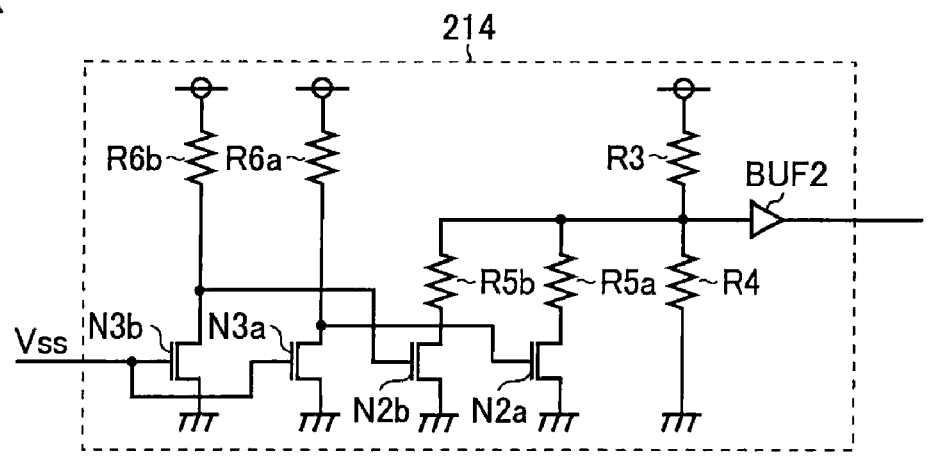
FIG. 6A A diagram illustrating a modified example of a clamp circuit 214.
Figure 6B:
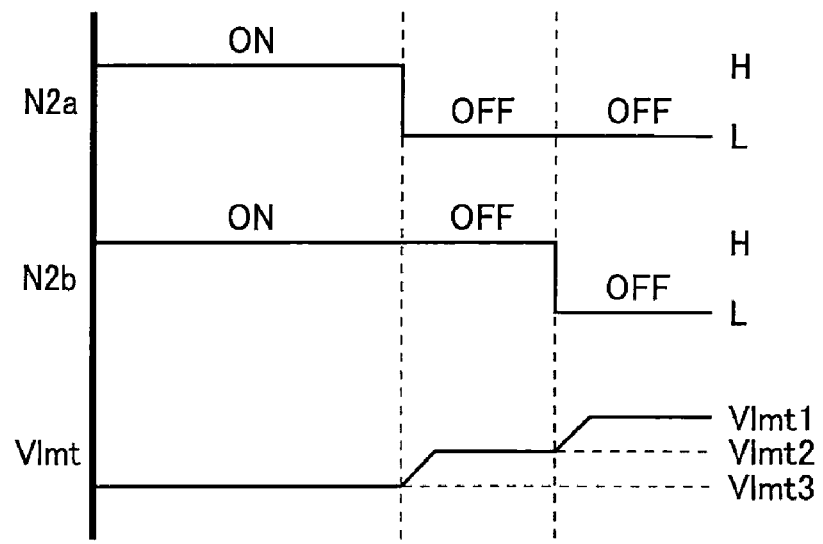
FIG. 6B A diagram illustrating the behavior of the modified example of the clamp circuit 214.

A modified example of the clamp circuit 214 and its behavior are shown in FIGS. 6A and 6B, respectively.

As shown in FIG. 6A, in this modified example of the clamp circuit 214, a plurality of resistors R5a and R5b are connected in parallel to a resistor R4, and transistors N2a and N2b are connected in series to the resistors R5a and R5b, respectively; as shown in FIG. 6B, multi-stage clamp control (in this figure, three-stage clamp control) is performed according to the on/off states of the transistors N2a and N2b.

With this configuration, the switch current Isw that flows at the cancellation of clamp operation at each stage can be kept moderate, and the amount of electric power wasted at start-up of the device can be further reduced.

Incidentally, it is preferable that, in order to turn on and off the transistors N2a and N2b, a difference be given between the on-voltages of the transistors N2a and N2b by appropriately adjusting their device constants (W/L) for determining their gate potentials. Instead of adjusting the device constants of the transistors N2a and N2b, a difference may be given between the source potentials of the transistors N3a and N3b by connecting a diode or the like between the sources of the transistors N3a and N3b and the ground lines.

Instead of the transistors N3a and N3b, a comparator may be provided whose output logic changes according to which of the soft-start voltage Vss and a predetermined threshold value is higher so as to turn on and off the transistors N2a and N2b according to the comparison output of the comparator.

In the embodiment described above, a configuration is dealt with in which the soft-start voltage Vss is monitored and, as its voltage value rises, the upper limit value Vlmt of the error voltage Verr is increased stepwise. This, however, is not meant to limit the configuration of the present invention in any manner, and a configuration may be adopted in which time-counting means such as a timer circuit is additionally provided, and according to the counted time, the upper limit value Vlmt of the error voltage Verr is increased stepwise. It is preferable that a highly precise control be performed by using time-counting means such as a timer circuit, particularly in the case where multi-stage clamp control is performed in the clamp circuit 214 as shown in FIGS. 6A and 6B.

INDUSTRIAL APPLICABILITY

The present invention provides technologies useful for enhancing the response of an electronic appliance incorporating a power supply device, and can be suitably used in electronic appliances in general incorporating a power supply device, such as battery-operated electronic appliances.

What is claimed is:

1. A power supply device, comprising:
   an output transistor to generate an output voltage from an input voltage by being turned on and off;
   an error amplifier to generate an error voltage by amplifying a difference between a feedback voltage corresponding to the output voltage and a predetermined reference voltage;
   a clamp circuit to set an upper limit value of the error voltage;
   a soft-start circuit to generate a comparison voltage for soft starting, the comparison voltage starting to rise when the power supply device is started up;
   a PWM comparator to compare a lower of the error voltage and the comparison voltage for soft starting with a predetermined slope voltage so as to generate a PWM signal having a duty corresponding to a comparison result; and
   means for turning the output transistor on and off by using the PWM signal,
   wherein the clamp circuit increases the upper limit value of the error voltage stepwise after the device is started up.

2. The power supply device of claim 1, wherein the clamp circuit is adapted to monitors the comparison voltage for soft starting, and as the value of the voltage increases, the clamp circuit increases the upper limit value of the error voltage stepwise.

3. The power supply device of claim 1, wherein the clamp circuit is adapted to monitor a length of time that has passed since soft starting started and, when the length of passed time reaches a predetermined value, the clamp circuit starts increasing the upper limit value of the error voltage stepwise.

4. The power supply device of claim 1, further comprising:
an inductor having a first end connected to a node to which the input voltage is applied, and a second end connected to a first end of the output transistor;
a diode having an anode connected to the first end of the output transistor, and a cathode connected to a node from which the output voltage is extracted; and
a capacitor having a first end connected to the extraction terminal of the output voltage, and a second end connected to a node to which a standard voltage is applied,
wherein the power supply device is adapted to generates the output voltage by stepping up the input voltage.

5. A power supply device, comprising:
an output transistor and a synchronous rectification transistor to generate a desired output voltage from an input voltage by being turned on and off in a manner complementary to each other;
an error amplifier to generate an error voltage by amplifying a difference between a feedback voltage corresponding to the output voltage and a predetermined reference voltage;
a soft-start circuit to generate a comparison voltage for soft starting, the comparison voltage starting to rise in response to a level change in an enable signal;
a PWM comparator to compare a lower of the error voltage and the comparison voltage for soft starting with a predetermined slope voltage so as to generate a PWM signal having a duty corresponding to the comparison result;
means for turning on and off the output transistor and the synchronous rectification transistor by using the PWM signal;
a reference voltage detection circuit to detect, each time the enable signal changes a level thereof, whether or not the reference voltage has started to rise;
an output voltage detection circuit to detect, each time the reference voltage detection circuit finds the reference voltage to have started to rise, whether or not the output voltage has reached a predetermined threshold value; and
a soft-start interruption circuit that, when the output voltage detection circuit finds the output voltage to have reached the predetermined threshold value, cuts off a transmission path through which the comparison voltage for soft starting is transmitted from the soft-start circuit to the PWM comparator.

6. A power supply device, comprising:
an output transistor and a synchronous rectification transistor to generate a desired output voltage from an input voltage by being turned on and off in a manner complementary to each other;
an error amplifier to generate an error voltage by amplifying a difference between a feedback voltage corresponding to the output voltage and a predetermined reference voltage;
a soft-start circuit to generate a comparison voltage for soft starting, the comparison voltage starting to rise in response to a level change in an enable signal;
a PWM comparator to compare a lower of the error voltage and the comparison voltage for soft starting with a predetermined slope voltage so as to generate a PWM signal having a duty corresponding to the comparison result;
means for turning on and off the output transistor and the synchronous rectification transistor by using the PWM signal; and
a clamp circuit to set an upper limit value of the error voltage and increase the upper limit value of the error voltage stepwise after the level change in the enable signal.

7. The power supply device of claim 6, wherein the clamp circuit is adapted to monitors the comparison voltage for soft starting and, as the value of the comparison voltage for soft starting increases, increases the upper limit value of the error voltage stepwise.

8. The power supply device of claim 6, wherein the clamp circuit is adapted to monitors a length of time that has passed since soft starting started and, when the length of passed time reaches a predetermined value, increases the upper limit value of the error voltage stepwise.

9. The power supply device of claim 6, further comprising:
an inductor having a first end connected to a node to which the input voltage is applied, and a second end connected to a connection node between the output transistor and the synchronous rectification transistor; and
a capacitor having a first end connected to a node from which the output voltage is extracted, and a second end connected to a node to which a standard voltage is applied,
wherein the power supply device is adapted to generates the output voltage by stepping up the input voltage.

10. A power supply device, comprising:
an output transistor to generate a desired output voltage from an input voltage by being turned on and off;
an error amplifier to generate an error voltage by amplifying a difference between a feedback voltage corresponding to the output voltage and a predetermined reference voltage;
a soft-start circuit to generate a comparison voltage for soft starting, the comparison voltage starting to rise in response to a level change in an enable signal;
a PWM comparator to compare a lower of the error voltage and the comparison voltage for soft starting with a predetermined slope voltage so as to generate a PWM signal having a duty corresponding to the comparison result;
means for turning the output transistor on and off by using the PWM signal;
a reference voltage detection circuit to detect, each time the enable signal changes a level thereof, whether or not the reference voltage has started to rise;
an output voltage detection circuit to detect, each time the reference voltage detection circuit finds the reference voltage to have started to rise, whether or not the output voltage has reached a predetermined threshold value; and
a soft-start interruption circuit that, when the output voltage detection circuit finds the output voltage to have reached the predetermined threshold value, cuts off a transmission path through which the comparison voltage for soft starting is transmitted from the soft-start circuit to the PWM comparator.

11. A power supply device, comprising:
an output transistor to generate a desired output voltage from an input voltage by being turned on and off;
an error amplifier to generate an error voltage by amplifying a difference between a feedback voltage corresponding to the output voltage and a predetermined reference voltage;

a soft-start circuit to generate a comparison voltage for soft starting, the comparison voltage starting to rise in response to a level change in an enable signal;

a PWM comparator to compare a lower of the error voltage and the comparison voltage for soft starting with a predetermined slope voltage so as to generate a PWM signal having a duty corresponding to the comparison result;

means for turning the output transistor on and off by using the PWM signal; and a clamp circuit to set an upper limit value of the error voltage and increases the upper limit value of the error voltage stepwise after the level change in the enable signal.

12. The power supply device of claim 11, wherein the clamp circuit is adapted to monitors the comparison voltage for soft starting and increases the upper limit value of the error voltage stepwise as the value of the voltage increases.

13. The power supply device of claim 11, wherein the clamp circuit is adapted to monitors a length of time that has passed since soft starting started and, when the length of passed time reaches a predetermined value, increases the upper limit value of the error voltage stepwise.

14. The power supply device of claim 11, further comprising:

an inductor having a first end connected to a node to which the input voltage is applied, and a second end connected to a first end of the output transistor;

a diode having an anode connected to the first end of the output transistor, and a cathode connected to a node from which the output voltage is extracted; and a capacitor having a first end connected to the node from which the output voltage is extracted, and a second end connected to a node to which a standard voltage is applied, wherein the power supply device is adapted to generates the output voltage by stepping up the input voltage.

15. An electronic appliance, comprising:

a battery serving as an electric power source of the appliance;

a power supply device according to claim 1 serving as means for converting an output of the battery; and a load circuit driven by the power supply device.

16. An electronic appliance, comprising:

a battery serving as an electric power source of the appliance;

a power supply device according to claim 6 serving as means for converting an output of the battery; and a load circuit driven by the power supply device.

17. An electronic appliance, comprising:

a battery serving as an electric power source of the appliance;

a power supply device according to claim 11 serving as means for converting an output of the battery; and a load circuit driven by the power supply device.

* * * * *